United States Patent
Mese et al.

(10) Patent No.: US 9,721,447 B2
(45) Date of Patent: Aug. 1, 2017

(54) DISPLAY OF RECHARGEABLE BATTERY CHARGE NOTIFICATION

(71) Applicant: Lenovo (Singapore) Pte. Ltd., Singapore (SG)

(72) Inventors: John Carl Mese, Cary, NC (US); Russell Speight VanBlon, Raleigh, NC (US); Arnold S. Weksler, Raleigh, NC (US); Nathan J. Peterson, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/859,326

(22) Filed: Sep. 20, 2015

(65) Prior Publication Data

US 2017/0084155 A1    Mar. 23, 2017

(51) Int. Cl.
*G08B 21/00*    (2006.01)
*G08B 21/18*    (2006.01)

(52) U.S. Cl.
CPC ................. *G08B 21/182* (2013.01)

(58) Field of Classification Search
CPC ...................................................... G08B 21/182
USPC ...................................................... 340/636.1
See application file for complete search history.

(56) References Cited

U.S. PATENT DOCUMENTS

| 2008/0111523 | A1* | 5/2008 | Kim ...................... H02J 7/0047 320/162 |
| 2009/0024863 | A1* | 1/2009 | Karstens ............ G01R 31/3648 713/340 |
| 2011/0057807 | A1* | 3/2011 | Asai ........................ H01M 2/34 340/636.1 |
| 2012/0249323 | A1* | 10/2012 | McRae .................. G08C 17/00 340/539.11 |
| 2014/0340232 | A1* | 11/2014 | Gao .................... H01M 10/488 340/636.15 |

OTHER PUBLICATIONS

Lendino and Anthony, How USB charging works, or how to avoid blowing up your smartphone http://www.extremetech.com, Aug. 26, 2015 (11 pages).
Sherman (maxim integrated), The Basics of USB Battery Charging: A Survival Guide, Tutorial/Application Note 4803, Dec. 9, 2010 (15 pages).
Maxim integrated, MAX14578E/MAX14578AE USB Battery Charger Detectors, 19-5821; Rev 4; May 2014, May 2014 (23 pages).
Microchip Technology Inc., "Advanced Single or Dual Cell Lithium-Ion/Lithium-Polymer Charge Management Controllers", DS21823C, 2004 (24 pages).

* cited by examiner

*Primary Examiner* — Mark Rushing
(74) *Attorney, Agent, or Firm* — Brian J. Pangrle

(57) ABSTRACT

A method can include receiving power level information for a device that includes a rechargeable battery and a display; determining a power level differential based at least in part on the power level information and historical information of the device; and rendering a power level differential notice to the display.

36 Claims, 11 Drawing Sheets

DISPLAY OF RECHARGEABLE BATTERY CHARGE NOTIFICATION

TECHNICAL FIELD

Subject matter disclosed herein generally relates to technology for charge notifications.

BACKGROUND

Various types of devices, systems, etc. include at least one rechargeable battery.

SUMMARY

A method can include receiving power level information for a device that includes a rechargeable battery and a display; determining a power level differential based at least in part on the power level information and historical information of the device; and rendering a power level differential notice to the display. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
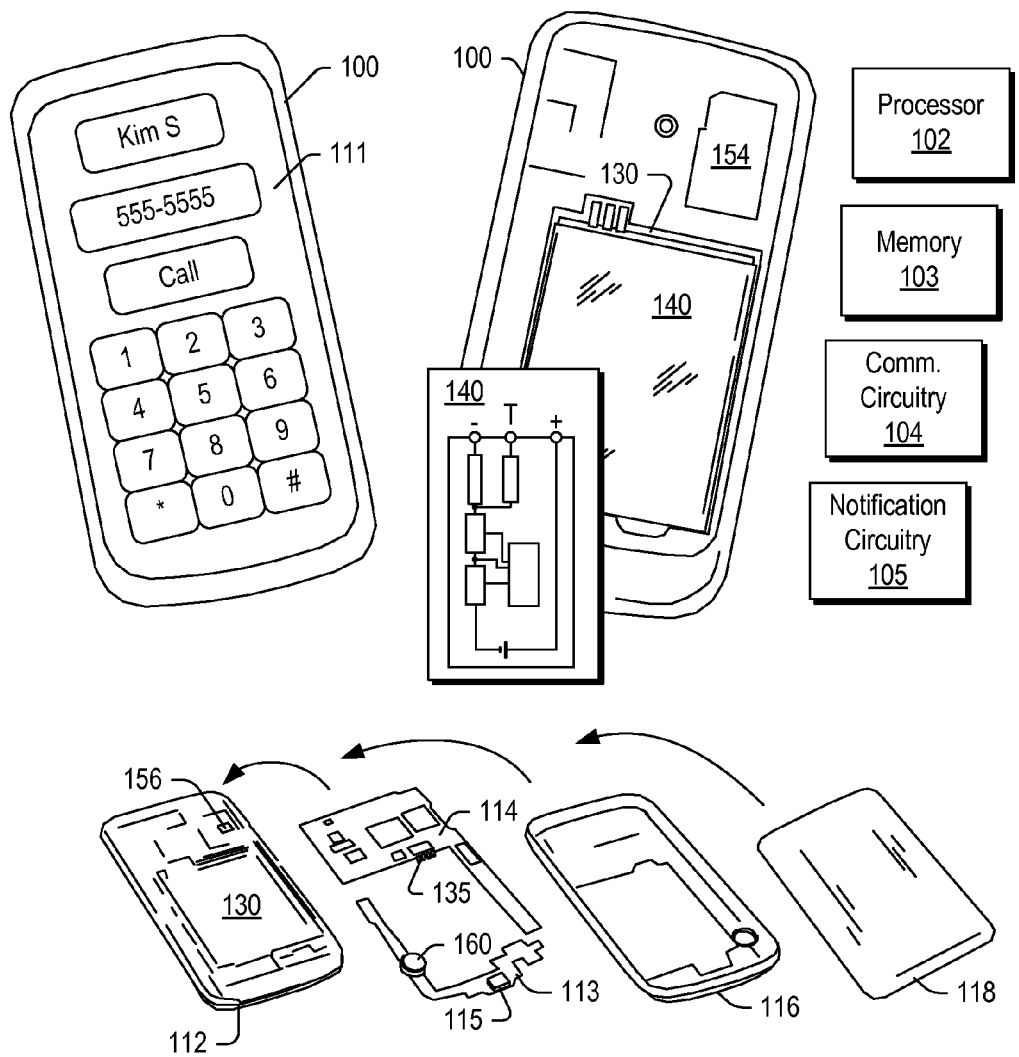
FIG. 1 is a diagram of an example of a mobile device and examples of associated circuitry.
Figure 1:
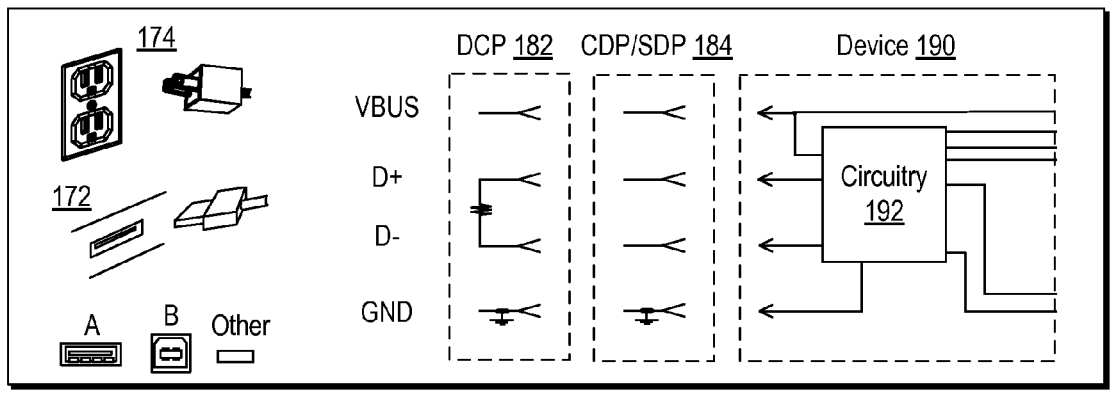

The following description includes the best mode presently contemplated for practicing the described implementations. This description is not to be taken in a limiting sense, but rather is made merely for the purpose of describing general principles of various implementations. The scope of invention should be ascertained with reference to issued claims.

Various devices include one or more rechargeable batteries. As an example, a device can include a display where information may be rendered to the display that shows power level of a rechargeable battery. For example, a battery power level graphic may change responsive to power level by showing a charge fill level or, for example, a display may show a percentage of full charge numerically. As an example, a device may show a charge fill level graphic and percentage of full charge as a numeric value (e.g., 25%, 50%, 100%, etc.).

If a power level of a battery is low and a user wants to recharge the battery, the user may not know how long it will take to charge the battery to a sufficient power level before the user can decouple from a recharger (e.g., consider a wired coupling or a wireless coupling).

As an example, different charging technologies (e.g., inductive, USB, or wall chargers) may charge at different rates, which may further complicate a user's ability to charge her device so that it can be used for an amount of time before requiring coupling for recharge.

As an example, a method can include receiving power level information for a device that includes a rechargeable battery and a display; determining a power level differential based at least in part on the power level information and historical information of the device; and rendering a power level differential notice to the display. In such an example, a user may determine whether a present power level of a rechargeable battery of a device is sufficient to perform one or more tasks with the device. As an example, such a method may include rendering an estimated charge time to achieve a sufficient power level to perform one or more tasks. For example, where a user has a scheduled phone call with an estimated call time and an estimated call duration, the estimated charge time may account for such historical information (e.g., as may be entered in an agenda, etc.).

As an example, a method can include issuing a notification as to charging (e.g., charge rate, charge time, charge duration, etc.) based on one or more parameters such as, for example, a charger and/or adapter type parameter value (e.g., a cable to USB port of a device parameter value, a cable to USB port of a wall plug adapter parameter value, cable to wall plug adapter parameter value, a field coupled "wireless" parameter value, a vehicle power source parameter value, etc.).

As an example, a method can include issuing a notification that provides an estimate of how much charge time is needed to charge up to a particular power level to get the user through the rest of the day, for example, based on time of day and historical information (e.g., historical power usage, etc.). As an example, a method can include issuing a notification that provides an estimate of how much charge time is needed to power a device until the device may be able to charge again. For example, where a user is walking a city street to a parking garage to get his car, an estimate may indicate that the user should charge his device for about 30 minutes in the car where the 30 minute charge should be sufficient to power usage of the device until the user gets home, for example, at around 7:00 PM where the user historically plugs the device into a charger for the night.

As an example, a scenario can include a user and a device with a rechargeable battery where the power level of the battery is low (e.g., less than about 25 percent of full charge power level). In such an example, the user may, via a cable, plug the device into a USB port of a computer. In response, a notification may be generated and issued that indicated that it will take 40 minutes to charge the rechargeable battery of the device to 70 percent of a full power level, which should be enough to get to the end of the day based on past usage, which may be weighted, for example, weighting may weigh the last 24 hours usage more heavily than usage that is more than 24 hours. In such a scenario, a notification may indicate that, if the user switches to a wall charger, the charge time to 70 percent of full power level may be 28 minutes (e.g., 12 minutes less that the USB port charge). As a device may also be aware that a user may be driving to an appointment, it may factor in a car charger to reduce the wait further.

As an example, usage may consider types of usage, duration of usage, etc. For example, consider an application such as the CANDY CRUSH SAGA™ video game marketed by King Digital Entertainment (Dublin, Ireland). Such a game may consume considerable video resources of a device and may be played for a particular duration. Such a game may be an "app" suitable for execution on a device that includes an operating system such as, for example, an IOS™ OS, an ANDROID™ OS, a FIRE™ OS, a WINDOWS™ OS, etc. Usage may optionally account for operating system efficiency in app execution and/or hardware efficiency in app execution.

As an example, usage may consider types of usage such as texting, voice calls via a cellular network, voice calls via an IP network, video calls via a cellular network, video calls via an IP network, mixed network usage types, etc. As an example, usage may consider types of usage such as web-browsing via a web browser app, rendering music files, rendering video files, etc. As an example, a music file may be stored locally and/or remotely. As an example, a video file may be stored locally and/or remotely. As an example, usage may account for downloading content and/or rendering of downloaded content. As an example, usage may account for a download schedule, a rendering schedule, etc. For example, consider a user that downloads content for a particular show that is available for download on a weekly schedule and, for example, where the user watches the downloaded content at a particular day and time each week. Such information may be historical information that can be used, at least in part, to determine a power level differential of a device with one or more rechargeable batteries.

FIG. 1 shows an example of a mobile device 100 that includes a processor 102, memory 103 operatively coupled to the processor 102, communication circuitry 104 operatively coupled to the processor 102, and notification circuitry 105 operatively coupled to the processor 102.

As shown in the example of FIG. 1, the device 100 includes a display 111, which may be a touch display for input of information (e.g., via a key pad, control graphics, etc.) and output of information, for example, with a resolution of m×n pixels (e.g., with a density of about 200 pixels per inch or more). As shown, the mobile device 100 includes various components including a display frame 112 with a bay 130 and display graphics circuitry 156 (e.g., optionally including touch and gesture circuitry). The display frame 112 can receive circuitry components 113 and 114, which may carry items such as a vibrator 160, a SIM slot, the processor 102, audio circuitry (e.g., for rendering content, for issuing notifications such as ringtones, etc.), power management circuitry, motion processing circuitry (e.g., accelerometer, gyroscope), modem circuitry, pressure sensor circuitry, multi-band power amplification circuitry, the memory 103 (e.g., SDRAM, etc.), and communication circuitry 104 (e.g., cellular circuitry, wireless LAN circuitry, etc.). As an example, the device 100 may include GPS circuitry and/or other location determination circuitry.

As to the processor 102, it may be a single or multi-core processor and may include its own memory (e.g., RAM and optionally other memory). In the example of FIG. 1, the circuitry component 113 includes the vibrator 160 and a connector 115 (e.g., for power and/or information) and the circuitry component 114 includes a connector 135 for connecting a rechargeable battery 140 disposed at least partially in the bay 130. A cover 116 may cover the circuitry components 113 and 114 as seated with respect to the display frame 112 and a door 118 may be positioned with respect to the cover 116, for example, to provide for insertion and removal of the rechargeable battery 140 and a SIM 154.

As an example, the connector 115 may be suitable for connection to a cable or cables. For example, consider a cable connectable to a port such as a USB port 172, a cable connectable to an outlet such as an AC outlet 174 (e.g., a wall outlet, etc.). As an example, a wall wart may be an AC adapter that can be plugged into a wall outlet. As an example, a wall wart may include a socket that can receive a plug of a cable where power may be provided from the wall wart to the cable via the plug for purposes of charging a rechargeable battery of a device. As an example, consider a power adapter that includes a port as well as a cable for supplying power to a piece of equipment. In such an example, the port may be used, for example, to charge one or more types of devices. Such a port may be a USB port configured for charging but not for data transfer or, for example, such a port may be a USB port configured for charging and data transfer.

As an example, a cable may be a USB cable, a proprietary cable, or other type of cable. As an example, a cable may include at least one connector. As an example, a cable may include two connectors, one at each end which may differ. As an example, a cable may be a "Lightning" cable, as configured for various APPLE™ devices (e.g., including an eight-pin connector that can carry power and digital signals). As an example, equipment may include features of one or more of the specifications USB Type-A, USB Type-B and USB Type-C (e.g., a reversible-plug connector).

As an example, a device, a battery and/or a cable may include circuitry such as converter circuitry and/or detector circuitry. As an example, converter circuitry may convert power supply types AC to AC, AC to DC and/or DC to DC. As to a detector, consider charger detection circuitry that can detect a type of charger.

FIG. 1 shows an example of dedicated charging port (DCP) circuitry 182, an example of charging downstream port (CDP) and/or standard downstream port (SDP) circuitry 184 and an example of a device 190 that includes circuitry 192 operable coupled to a connector and to other circuitry of the device 190. As an example, the circuitry 192 may be or include detector circuitry. As an example, a device may include circuitry that can detect a DCP but cannot distinguish between an SDP and a CDP, where, in some instances, it can miss the opportunity to draw more charging current from a CDP. As an example, a device may include circuitry that can detect and distinguish a DCP, an SDP and a CDP. As an example, where a device include circuitry that can detect (e.g., and distinguish) a DCP, an SDP and a CDP, notification circuitry may provide a notice or notices as to one or more charge times that are based at least in part on an ability to detect such different charging configurations.

As an example, a device may include circuitry that can detect type of charging equipment (e.g., USB cable, and USB CDP or dedicated charger, etc.). In such an example, the circuitry may be operatively coupled to power management circuitry such as, for example, power management circuitry for charging one or more Li-ion batteries.

As an example, a device may include circuitry that can implement USB Battery Charging Rev 1.1-compliant detection logic which includes data contact detection, D+/D− short detection, and CDP identification. As an example, circuitry can include a charge timer and weak-battery voltage monitor to support USB BC1.1 "Dead Battery" provisions.

As to some examples of power-related values associated with USB Specifications, consider USB 1.0 port ratings of about 150 mA, about 5 V and about 0.75 W; consider USB 2.0 port ratings of about 500 mA, about 5 V and about 2.5 W; and consider USB 3.0 port ratings of about 900 mA, about 5 V and about 4.5 W. As to some examples of other types of charging equipment, an IPAD™ charger (e.g., wall wart) may provide, for example, about 2.1 A at about 5 V, a KINDLE FIRE™ charger (e.g., wall wart) may provide about 1.8 A; and a vehicle charger may output, for example, from about 1 A to about 2.1 A. As an example, chargers may be available for various types of devices (e.g., mobile information handling devices) where a charger may be able to provide current in a range from about one hundred milliamperes to about several amperes (e.g., about 3 A or more).

As an example, a device may include circuitry that can detect a charger type, for example, as to an amount of current available for charging a rechargeable battery (e.g., recharging the rechargeable battery). As an example, a device can include circuitry that can provide information associated with one or more charger types. For example, such information may include a time estimate for a charger type based at least in part on a current rating (e.g., and optionally voltage where voltage may vary) where the time estimate may be for an amount of charge to reach a target level that may be less than a full charge level.

As an example, a SDP may be defined by the USB 2.0 Specification where a maximum load current is about 2.5 mA when suspended, about 100 mA when connected and not suspended, and about 500 mA (max) when configured for that current. As an example, a device may recognize a SDP with hardware by detecting that the USB data lines, D+ and D−, are separately grounded through a resistance of about 15 kn. As an example, a CDP may be defined according to BC1.1 as a higher current USB port that can supply up to about 1.5 A. As an example, a device plugged into a CDP can recognize it via a hardware handshake implemented by manipulating and monitoring the D+ and D− lines. As an example, DCP BC1.1 describes power sources like wall warts and auto adapters that do not enumerate so that charging can occur with no digital communication. A DCP may supply up to about 1.5 A and may be identified, for example, via a short between D+ to D−. Such an approach allows, for example, for DCP wall warts that may feature a USB mini or micro receptacle instead of a permanently attached wire with a barrel or customized connector. Such adapters may, for example, allow one or more types of USB cables (e.g., with a correct plug or plugs) to be used for charging.

As an example, a battery charger may be specified in terms of battery capacity (e.g., C-rate). For example, a charger rated C/10 may be capable of charging a rechargeable battery to its full capacity in about 10 hours; whereas, a charger rated at 4 C may be capable of charging the same battery in about 15 minutes. As an example, charging can include monitoring one or more battery parameters (e.g., terminal voltage, temperature, etc.). As an example, a device may store information such as, for example, C-rate information as to one or more types of chargers.

As an example, a type of charger may be a power bank that can provide power to charge a rechargeable battery. As an example, a power bank may be a portable unit that includes one or more batteries that can provide power to a device such as, for example, a mobile information handling device (e.g., a mobile phone, a tablet, etc.).

As an example, upon initiation of charging a battery, a device may include detection circuitry that can detect type of charging equipment. In such an example, one or more charge times may be revised based at least in part on such detection. For example, where a notice indicates a time of about 15 minutes to reach a target charge level using low power charge equipment and where a device detects higher power charge equipment, the device may issue an updated time (e.g., 10 minutes rather than 15 minutes).

As an example, a device may render information to a display for multiple charger types and then, for example, responsive to being operatively coupled to a type of charger, the device may render information for that type of charger in a highlighted manner. For example, where multiple types are shown, upon coupling to one type, the other types may be faded out, no longer rendered, etc. and/or, for example, the coupled type may be highlighted by intensity, flashing, underling, color, etc.

As an example, when a device is operatively coupled to a charger after a notice has been rendered to a display (e.g., a display of the device), responsive to being operatively coupled, the device may implement a timer that counts down the estimated time for charging a rechargeable battery of the device to the target level. As an example, a device may issue an alarm or alarms as part of a count down. As an example, a device may render a graphic that indicates how much time is remaining and/or how much time has passed since being operatively coupled to a charger. As an example, a device may issue a two minute alarm (e.g., or of another pre-completion time or interval) such as "get ready to go, charge complete in two minutes".

As an example, a device may include memory that stores historical information germane to type of charging equipment (e.g., type of charger, charger type, etc.). For example, historical information may indicate times and duration of charging via a SDP, a CDP and/or a DCP. As an example, a device may implement port detection using one or more approaches. For example, consider a firmware approach, a charger approach or an interface circuit approach. As an example, detection may include interacting with data lines (e.g., USB D+ and D−), etc.

Various components, upon assembly may form a chassis. For example, the mobile device 100 as shown without the door 118 may be considered a chassis, which includes a bay 130 for receipt of the rechargeable battery 140. In such an example, the components 112, 113, 114 and 116 may form the chassis. Other configurations are possible for forming a chassis, for example, consider a so-called flip or clamshell as an electronics form factor that includes a chassis with a bay for a battery. In such an example, two or more sections may fold via a hinge or hinges where if a hinge is on a long edge the device may be referred to as a clamshell device rather than a flip device (e.g., hinge on a short edge).

In the example of FIG. 1, the mobile device 100 may include itself, and/or via the rechargeable battery 140, circuitry for Near Field Communication (NFC) (e.g., an antenna, etc.). As to the connector 135, it may include a number of contacts that correspond to those of a battery, for example, based on functionality.

As an example, a battery may include a positive contact and a negative contact and optionally one or more of a temperature contact and a bus contact (e.g., single wire or other bus). As shown in the example of FIG. 1, the rechargeable battery 140 can include circuitry, which may be digital, analog or digital and analog. A rechargeable battery may include one or more cells and may be a lithium-based battery or other type of battery.

As an example, a device can include a processor; memory operatively coupled to the processor; a display operatively coupled to the processor; a rechargeable battery operatively coupled to at least the processor; and instructions stored in the memory executable by the processor where the instructions include instructions to instruct the processor to receive power level information; determine a power level differential based at least in part on the power level information and historical information; and render a power level differential notice to the display. For example, consider the device 100 of FIG. 1, as including the processor 102, the memory 103, the display 111 and instructions stored in the memory 103 and executable by the processor 102 to instruct the processor 102 to receive power level information (e.g., associated with the rechargeable battery 140); determine a power level differential based at least in part on the power level information and historical information (e.g., stored in the memory 103, etc.); and render a power level differential notice to the display 111.

As an example, a device can include a processor; memory operatively coupled to the processor; a display operatively coupled to the processor; a rechargeable battery operatively coupled to at least the processor; and notification circuitry that can receive power level information; determine a power level differential based at least in part on the power level information and historical information; and call for rendering a power level differential notice to the display. For example, consider the device 100 of FIG. 1, the processor 102, the memory 103, the display 111, the rechargeable battery 140 and the notification circuitry 105.

Figure 2:
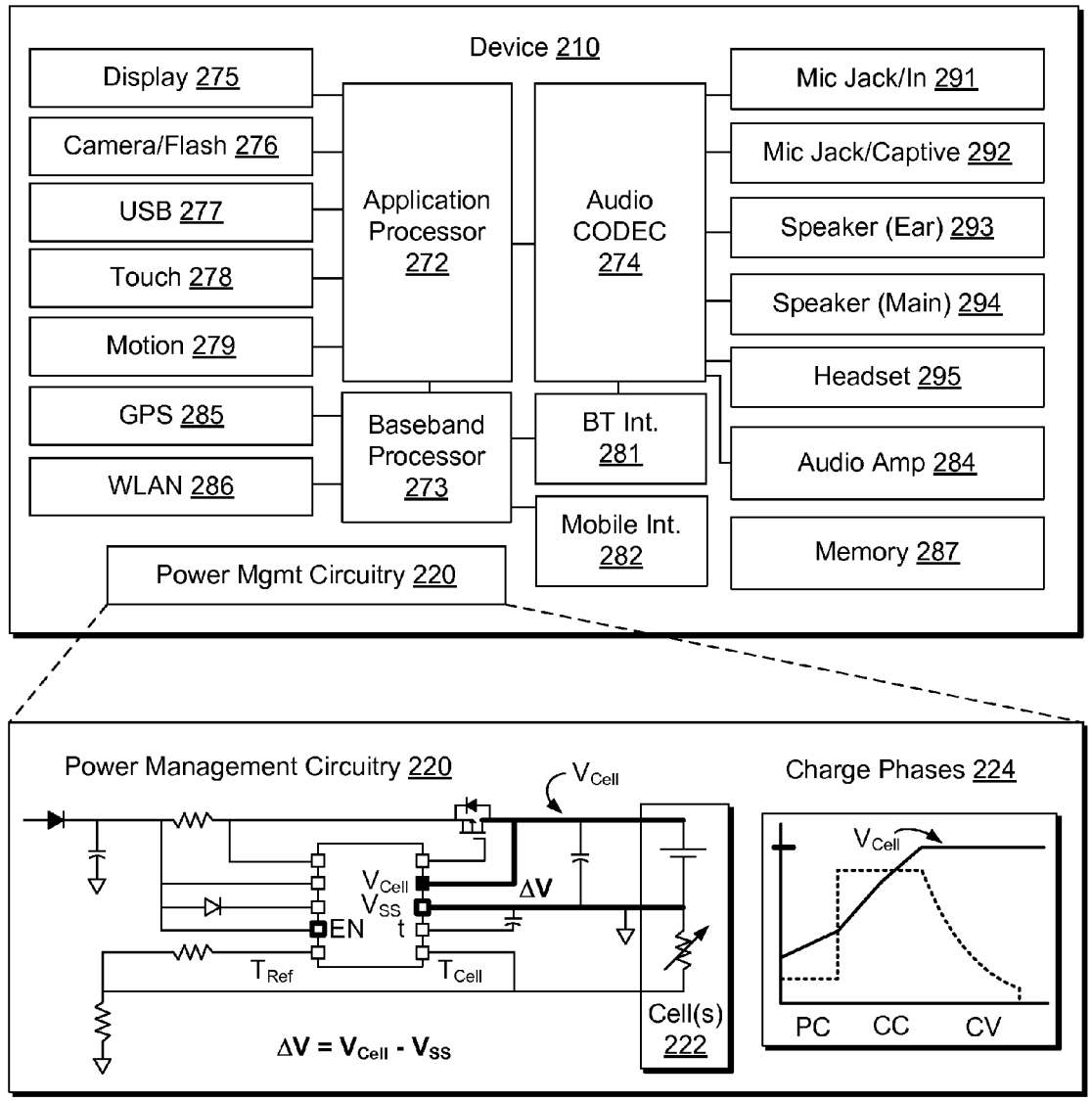
FIG. 2 is a diagram of an example of a mobile device that includes an example of power management circuitry.

FIG. 2 shows a block diagram of an example of a device 210 and a diagram of an example of power management circuitry 220 operable with respect to one or more power cells 222, for example, to charge such one or more cells via a process that may include charge phases per an approximate plot 224. As an example, the device 100 of FIG. 1 may include one or more features of the device 210 of FIG. 2.

In FIG. 2, the device 210 includes an application processor 272, a baseband processor 273, an audio codec 274, a display 275 (e.g., including display driver circuitry), a camera/flash sub-system 276, a USB port 276, touch sensing circuitry 278, motion sensing circuitry 279, BLUETOOTH® circuitry 281, mobile circuitry 282, the power management circuitry 220, audio amplification circuitry 284, GPS circuitry 285, WLAN circuitry 286, memory 287, a microphone jack in 291, a captive microphone 292, a captive speaker 293, one or more additional speakers 294, and headset out/circuitry 295. Various types of interfaces may exist between circuitry of a device such as the device 210. As an example, consider an $I^2S$ interface, which may, for example, operatively couple the application processor 272 and the audio codec 274; the baseband processor 273 and the audio codec 274; and the BLUETOOTH® circuitry 281 and the audio codec 274.

In the example of FIG. 2, various circuits, etc., may consume power. For example, the GPS circuitry 285 may consume power in receiving signals and determining a position of the device 210, the BLUETOOTH® circuitry 281 may consume power in transmitting information to another device, the camera/flash sub-system 276 may consume power when taking a photo (e.g., consider flash photo, video, etc.), the audio codec 274 may consume power when rendering audio information, etc.

As an example, a device such as the device 210 may include memory that stores usage information associated with usage of one or more features. For example, consider a data structure stored in the memory 287 that is organized to store usage times for different circuits, etc., of the device 210. In such an example, a usage history may be established as to individual features of the device 210. As an example, a usage history (e.g., historical information) may be utilized to determine power consumption or expected power consumption for a device. For example, where a user operatively couples a device to a BLUETOOTH® headset while bicycling home from work (e.g., or walking home, etc.), on a relatively regular workday basis, the usage history may estimate an expected power consumption for operation of the device's BLUETOOTH® interface and/or associated circuitry (e.g., cellular communication circuitry, etc.). As an example, where location circuitry is active and/or mapping, road work, traffic, weather, etc., circuitry, an estimated expected power consumption may account for travel time (e.g., via updates, etc.).

As an example, a device may include memory that stores power consumption information at a granular level, for example, as may be associated with one or more particular circuits, usage of one or more particular circuits, etc. As an example, a device may include memory that stores power consumption information at a macro level, for example, as may be associated with power management circuitry such as the power management circuitry 220. As an example, a device may include memory that stores power consumption information at one or more levels (e.g., granular and macro). As an example, such information may be historical information and utilized to issue one or more notifications. For example, consider a recharge time notice to achieve a power level sufficient to perform one or more upcoming tasks.

In the example of FIG. 2, the power management circuitry 220 can manage charging of the one or more power cells 222 and, for example, provide information as to one or more of power consumption, power level, etc. As an example, information associated with the power management circuitry 220 may be stored in memory such as, for example, the memory 287 of the device 210. As an example, information may be stored and/or determined as to a charge time or charge times as to a power level at a present time and a target power level, optionally based at least in part on a type of power source available for charging. As an example, a target power level may be a level that is less than about 100 percent of a full charge. As an example, a target power level may be determined based at least in part on historical information (e.g., as to one or more upcoming tasks, etc.).

As shown in FIG. 2, the power management circuitry 220 may include an integrated circuit with a number of pins. Such pins may include, for example, charge current sense input, battery management input supply, charge status output, logic enable, cell temperature sensor bias, cell temperature sensor input, timer set, cell management 0 V reference, cell voltage sense, and drive output.

As to protection features, a cell temperature sensor bias feature may provide for a voltage reference to bias an external thermistor for continuous cell temperature monitoring and prequalification while a cell temperature sensor input feature may provide for input for an external thermistor for continuous cell temperature monitoring and prequalification (optionally may be disabled by applying a set voltage) and safety timers (e.g., preconditioning, fast charge, elapsed time termination, etc.) that may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle.

Also shown in FIG. 2 is an example of a charge phase plot 224 that indicates, as an example, how charging may include a preconditioning phase (PC), a constant current phase (CC) and a constant voltage (CV) phase.

A cell voltage sense function (e.g., implemented in part via the pin labeled "$V_{Cell}$") can provide for monitoring voltage at, for example, a positive terminal of a cell (e.g., for single, dual, etc., series cell packs with coke or graphite anodes) with respect to a reference that is based on the negative terminal of a cell (see, e.g., the pin labeled $V_{SS}$). Thus, the power management circuitry 220 may measure voltage (e.g., ΔV) as a difference between a cathode potential ($V_{cathode}$, as applied at the pin $V_{Cell}$) and an anode potential ($V_{anode}$, as applied at the pin $V_{SS}$). As an example, a specified voltage ($\Delta V_{REG}$) may be a limit for ΔV.

As an example, the power management circuitry 220 may operate stand-alone or in conjunction with one or more other circuits (e.g., a host controller, etc.). Management circuitry may apply constant current followed by constant voltage to charge one or more cells. As an example, charger circuitry may include a MPC7384X family chip (Microchip Technology, Inc., Chandler, Ariz.), which is described in a document entitled "Advanced Single or Dual Cell Lithium-Ion/Lithium-Polymer Charge Management Controllers" (Microchip Technology, Inc., 2004), which is incorporated by reference herein. As described herein, the term "lithium-ion" includes, for example, "lithium-polymer" as well as "lithium-ion polymer". Management circuitry may be provided with a battery, a package, a device, as part of dedicated power circuitry (e.g., a battery charger), etc.

Management circuitry may be configured to manage, to varying extent, state-of-charge (SOC) mismatch and capacity/energy (C/E); noting that as the number of cells and load currents increase, the potential for mismatch also increases. Though SOC may be more common, each type of mismatch problem may limit capacity (mA·h) of a pack of cells to capacity of the weakest cell.

In the example of FIG. 2, the power cell(s) 222 may include a polymer composite material such as polyethylene oxide or polyacrylonitrile that includes lithium salt. Such a cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. LiPo cell capacities can include capacities in a range, for example of about 50 mA·h (e.g., for a small cell such as for a BLUETOOTH® headset) to about 10 A·h or more for an electric vehicle (e.g., electric or hybrid).

As an example, a recharge (e.g., charge) method can include a commencement block for commencing a recharge of one or more cells. The commencement block can initiate a preconditioning (PC) phase and, thereafter, a constant current (CC) phase. As an example, a monitor block may follow for monitoring voltage of the one or more cells during a constant current (CC) phase. A decision block may be included that relies on monitoring of the voltage for comparison to a specified voltage ($\Delta V_{REG}$). Such a decision block can provide for deciding when the recharge process should terminate the constant current (CC) phase and commence a constant voltage (CV) phase.

In the example of FIG. 2, the power management circuitry 220 can reference inputs and outputs with respect to a management circuit reference potential ($V_{SS}$) that is intended to be a 0 V reference potential. In the circuitry 220, one of the pins, labeled $V_{SS}$, is electrically connected to the "negative" electrode of the cell(s) 222. Specifically, it is electrically connected with the anode(s) of the cell(s) 222. As an example, a decision may be made to commence a constant voltage (CV) phase when $V_{Cell} - V_{SS} = \Delta V_{REG}$.

As an example, a method can include a decision block for deciding when a constant voltage (CV) phase should terminate. For example, a storage register may store a value for a termination current $I_{TERM}$. In such an example, the decision block may receive the $I_{TERM}$ value from the storage register and compare it to a monitored current value. As the monitored current diminishes during the constant voltage (CV) phase, it eventually reaches the $I_{TERM}$ value, upon which termination of a recharge process may occur.

As an example, a recharge process may be terminated prior to reaching a termination current. For example, where a recharge process is interrupted by operatively decoupling a power cell or cells of a device from a power source (e.g., whether wired or wireless), a recharge process may be terminated and the power cell or cells may be less than fully charged.

Figure 3:
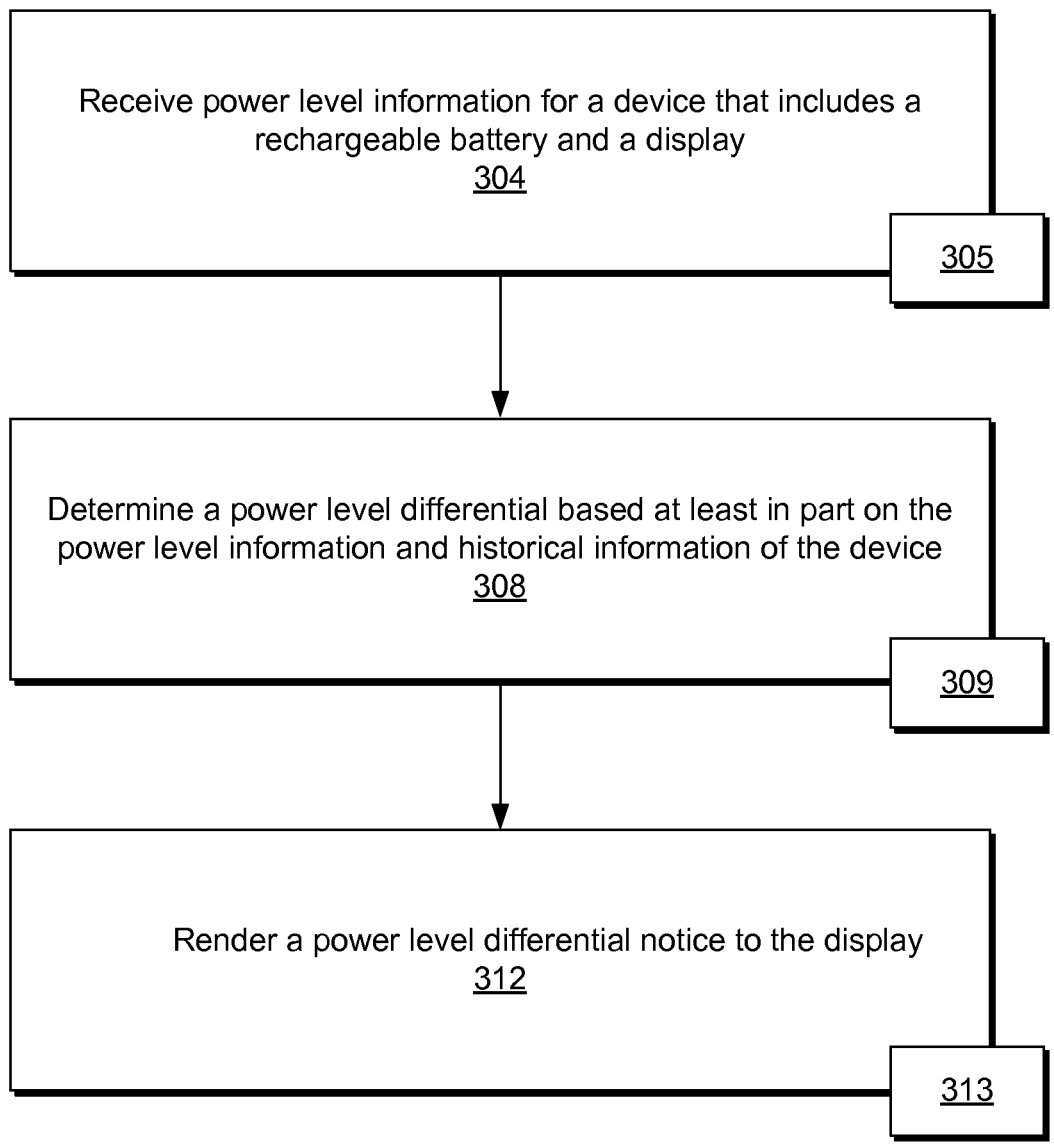
FIG. 3 is a diagram of an example of a method.

FIG. 3 shows an example of a method 300 that includes a reception block 304 for receiving power level information for a device that includes a rechargeable battery and a display; a determination block 308 for determining a power level differential based at least in part on the power level information and historical information of the device; and a render block 312 for rendering a power level differential notice to the display.

In the example of FIG. 3, the method 300 is shown along with various blocks 305, 309 and 313, which may be modules or instruction blocks, optionally provided as one or more computer-readable storage media that are not signals. For example, the blocks 305, 309 and 313 may be one or more computer-readable storage media that include processor-executable instructions where the instructions include instructions executable to instruct a processor to receive power level information (e.g., per the block 305); determine a power level differential based at least in part on the power level information and historical information (e.g., per the block 309); and render a power level differential notice to the display (e.g., per the block 313).

As an example, a power level differential may be based on a power level that is less than a maximum power level of a rechargeable battery. For example, a power level may be less than about 100 percent fully charged and sufficient to accomplish one or more tasks using a device powered by the rechargeable battery. For example, consider a level sufficient to make it through events X, Y and/or Z, optionally with a small margin above that level, yet not fully charged.

As an example, a notice may indicate how much time it will take to get to desired level. For example, a power level differential notice can include an estimated recharge time to compensate for the power level differential.

As an example, an estimated recharge time may account for a type of power source for recharging. For example, an estimated recharge time may correspond to one of a plurality of types of power sources for recharging a rechargeable battery.

As an example, a power level differential may be based at least in part on a time differential between a first time and a second time. For example, consider a first time that corresponds to a rechargeable battery powered state of the device and, for example, a second time that corresponds to a plugged-in recharger powered state of the device based at least in part on historical information (e.g., when a user is in a location that includes a power source that can be used to recharge).

As an example, a method can include calculating a power level differential based at least in part on a difference between a first power level associated with received power level information and a second power level associated with historical information. As an example, historical information may include cellular communication information. As an example, historical information may include information associated with one or more features of a device, which may be implemented simultaneously in time and/or discretely in time. For example, consider operation of BLUETOOTH® circuitry for communication with a headset and operation of cellular communication circuitry simultaneously or, for example, consider operation of BLUETOOTH® circuitry for communication with a remote speaker (e.g., a BLUETOOTH® speaker) and operation of audio rendering circuitry simultaneously.

As an example, a method may include accessing a calendar as to what is coming next and for how long. As an example, historical information can include agenda information, which may be associated with a calendar or calendars. As an example, agenda information may include information for one or more scheduled cellular communications.

As an example, historical information may be associated with one or more locations. As an example, a method may include receiving location information and, for example, associating the location information with at least a portion of historical information. In such an example, a method may include determining where a device is located at one or more times. As an example, such a method may include associating one or more power sources suitable for charging a rechargeable battery with one or more locations and/or one or more times.

As an example, a method can include rendering a power level associated with a corresponding recharge time or, for example, rendering a plurality of power levels associated with a plurality of corresponding recharge times.

Figure 4:
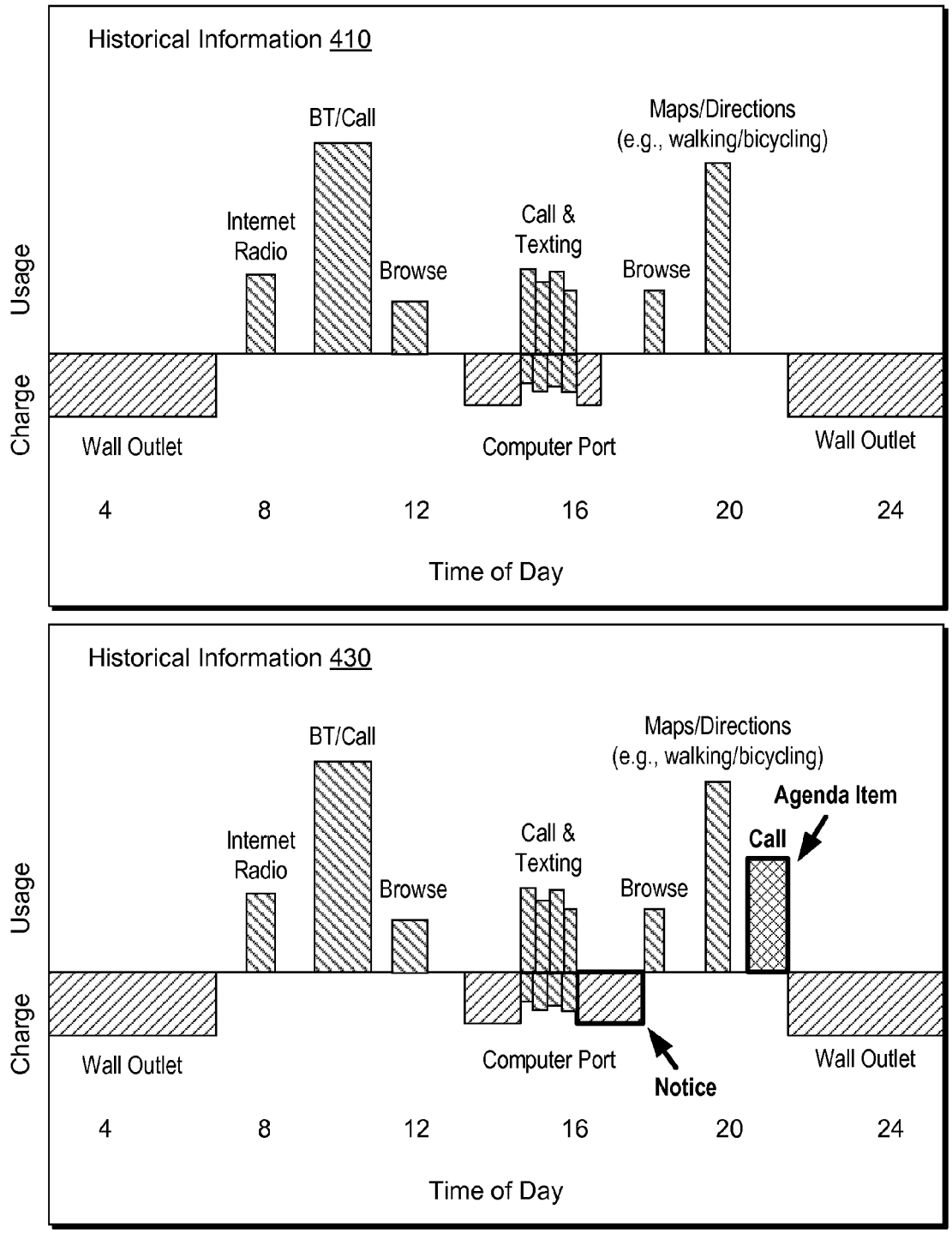
FIG. 4 is a diagram of examples of plots of historical information.

FIG. 4 shows an example plot of historical information 410 that includes usage information and charge information with respect to time of day. In the example plot 410, usage includes Internet radio (e.g., IHEART™ radio, NPR stream, etc.), a cellular call with BLUETOOTH® headset, Internet browsing, cellular call and texting, Internet browsing and maps/directions (e.g., while walking and/or bicycling). For example, a user may be walking or bicycling for recreation and tracking a path, time of exercise, etc. As another example, a user may be walking or bicycling to a particular location (e.g., a store, etc.). Such activities may occur where a user does not have access to a power source suitable for charging. As an example, a bicycle may be fit with a power source (e.g., solar, pedal power, a battery, etc.).

As to charging, the plot 410 shows wall outlet charging and computer port charging, which may optionally be characterized at least in part via charge equipment type (e.g., consider SDP, DCP, CDP, etc.). As shown in the plot 410, the computer port charging may coincide with usage such as calling and/or texting. Such usage while charging may act to reduce effectiveness of charging when compared to charging while not using such features.

FIG. 4 shows an example plot of historical information 430 where an agenda item pertains to a telephonic meeting to be held at about 8:30 PM for a period of an hour. In such an example, a notice may be issued at a prior time (e.g., prior to about 6 PM) that additional charging is needed if the user wants to make it through the telephonic meeting. For example, such a notice may indicate that the computer port charging should be extended for a period of time to reach a power level sufficient to make it through the telephonic meeting.

Figure 5:
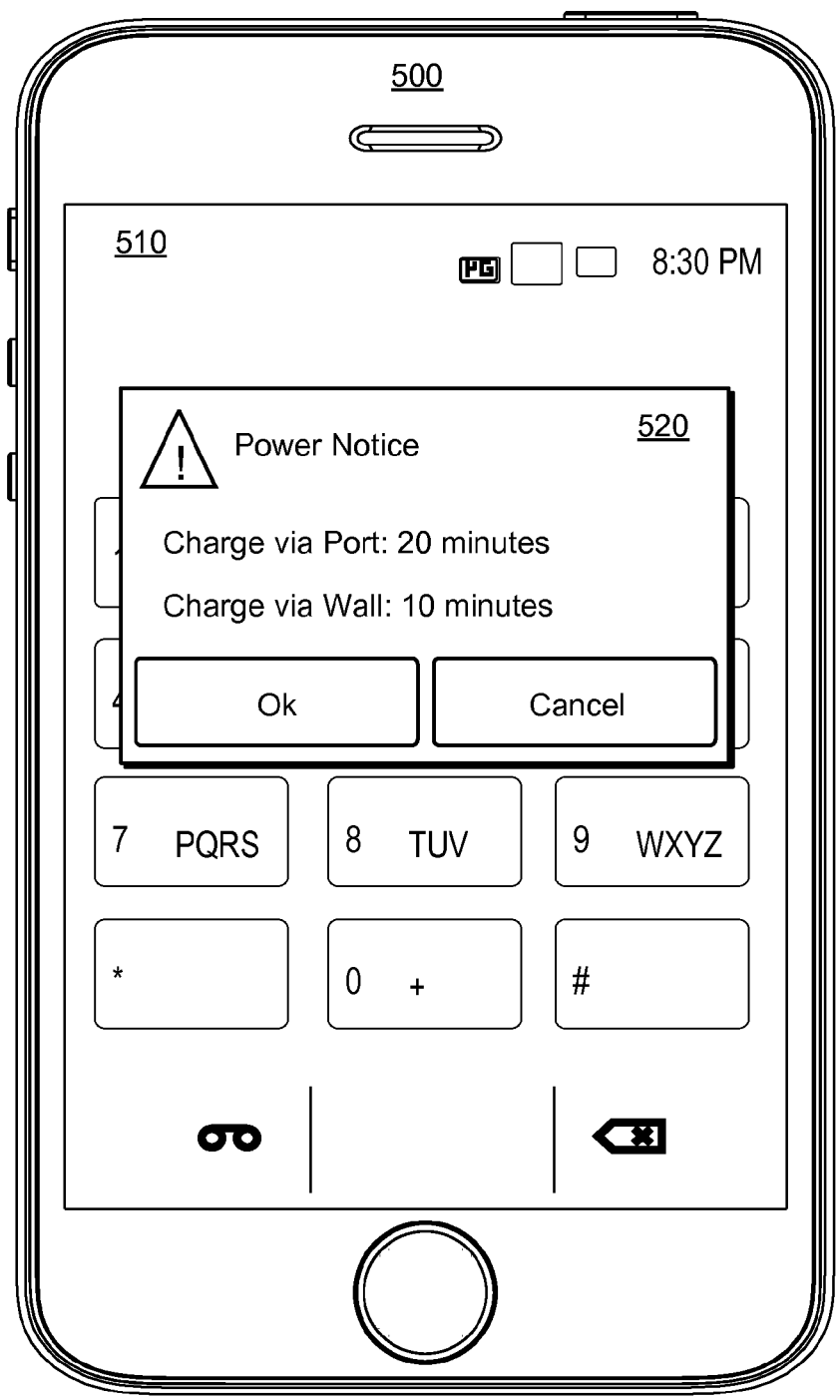
FIG. 5 is a diagram of an example of a device that includes a display to which a notice is rendered.

FIG. 5 shows an example of a device 500 that includes a display 510 and a notice 520 rendered to the display 510. In the example of FIG. 5, the notice 520 indicates a period of time to charge via a port and to charge via a wall outlet. As an example, activation of the OK button may cause the device 500 to expect charging while activation of the Cancel button may indicate that such options are not available (e.g., at the present time).

Figure 6:
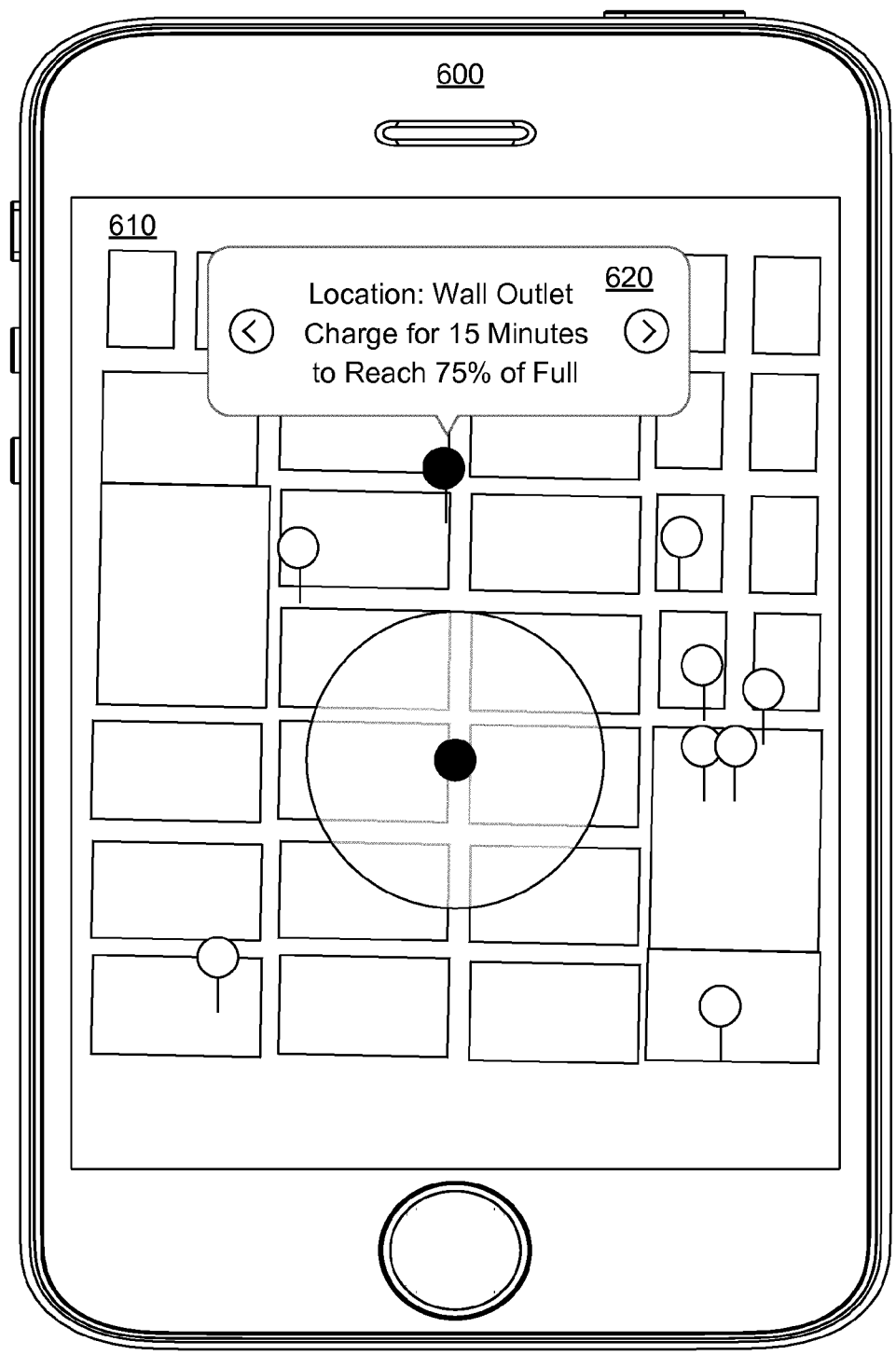
FIG. 6 is a diagram of an example of a device that includes a display to which a notice is rendered.

FIG. 6 shows an example of a device 600 that includes a display 610 and a notice 620 rendered to the display 610. In the example of FIG. 6, the notice 620 indicates a period of time to charge via a port to reach a power level (e.g., 75 percent of fully charged), for example, via a wall outlet, which may be available at a location proximate to the device 600 (per the filled circle with the ring around it). As an example, activation of a left arrow or a right arrow of the notice 620 may cause the device 600 to render information for another location.

Figure 7:
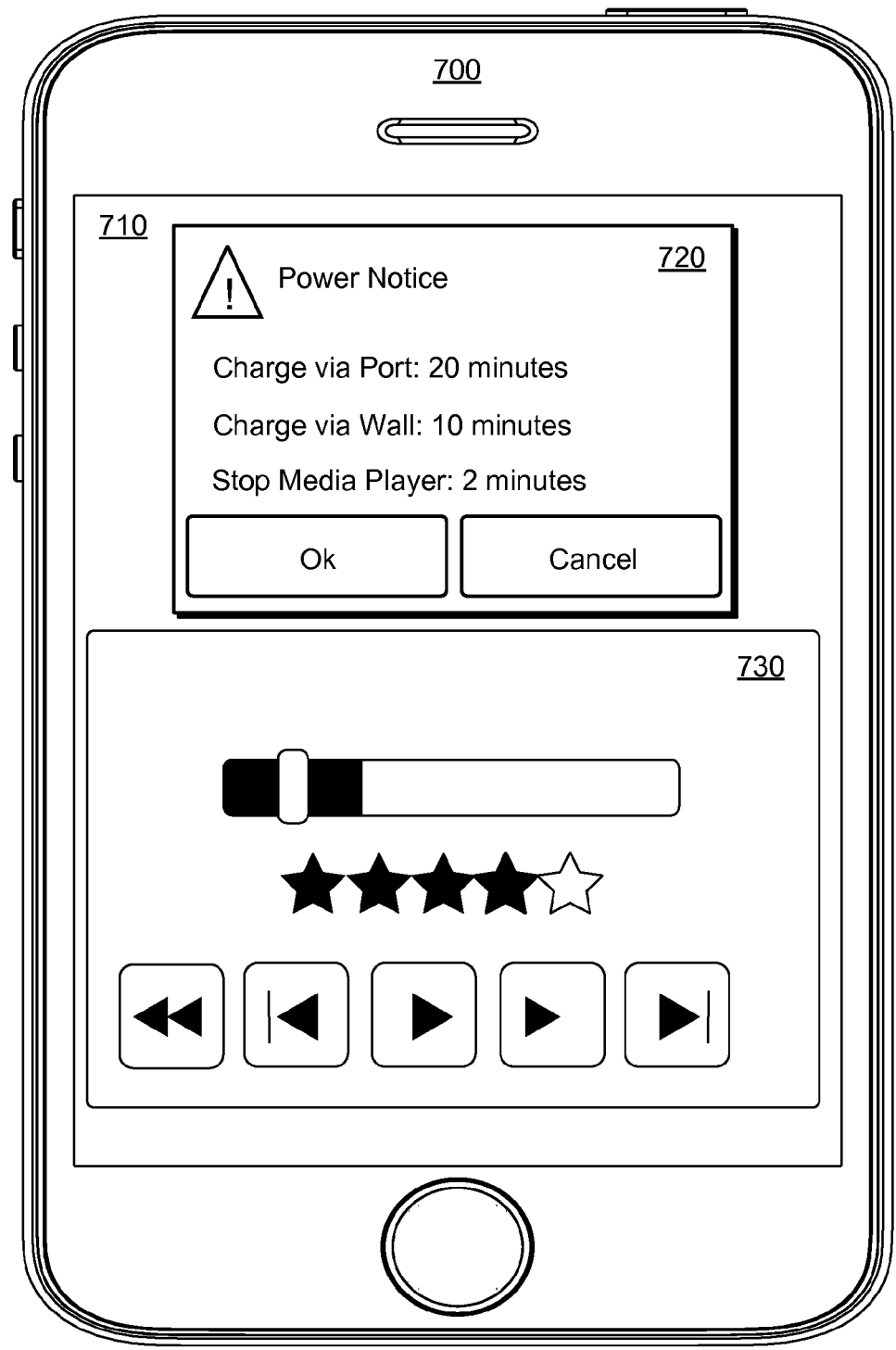
FIG. 7 is a diagram of an example of a device that includes a display to which a notice is rendered.

FIG. 7 shows an example of a device 700 that includes a display 710 and a notice 720 rendered to the display 710. As an example, an active application may be executing using resources of the device 700. For example, consider a media player that can utilize audio rendering circuitry of the device 700 and graphics circuitry of the device 700 to render a graphical user interface 730 to the display 710 of the device 700. In the example of FIG. 7, the notice 720 indicates a period of time to charge via a port and to charge via a wall outlet and an additional option to stop use of the media player within a period of time (e.g., within about 2 minutes). As an example, activation of the OK button may cause the device 700 to expect charging while activation of the Cancel button may indicate that such options are not available (e.g., at the present time). As an example, stopping of the media player (e.g., pausing or shutting down) may cause the device 700 to make a determination as to a power level differential, which may indicate that a present power level is sufficient and thereby cause the device 700 to refresh the display 710 such that the notice 720 no longer appears.

Figure 8:
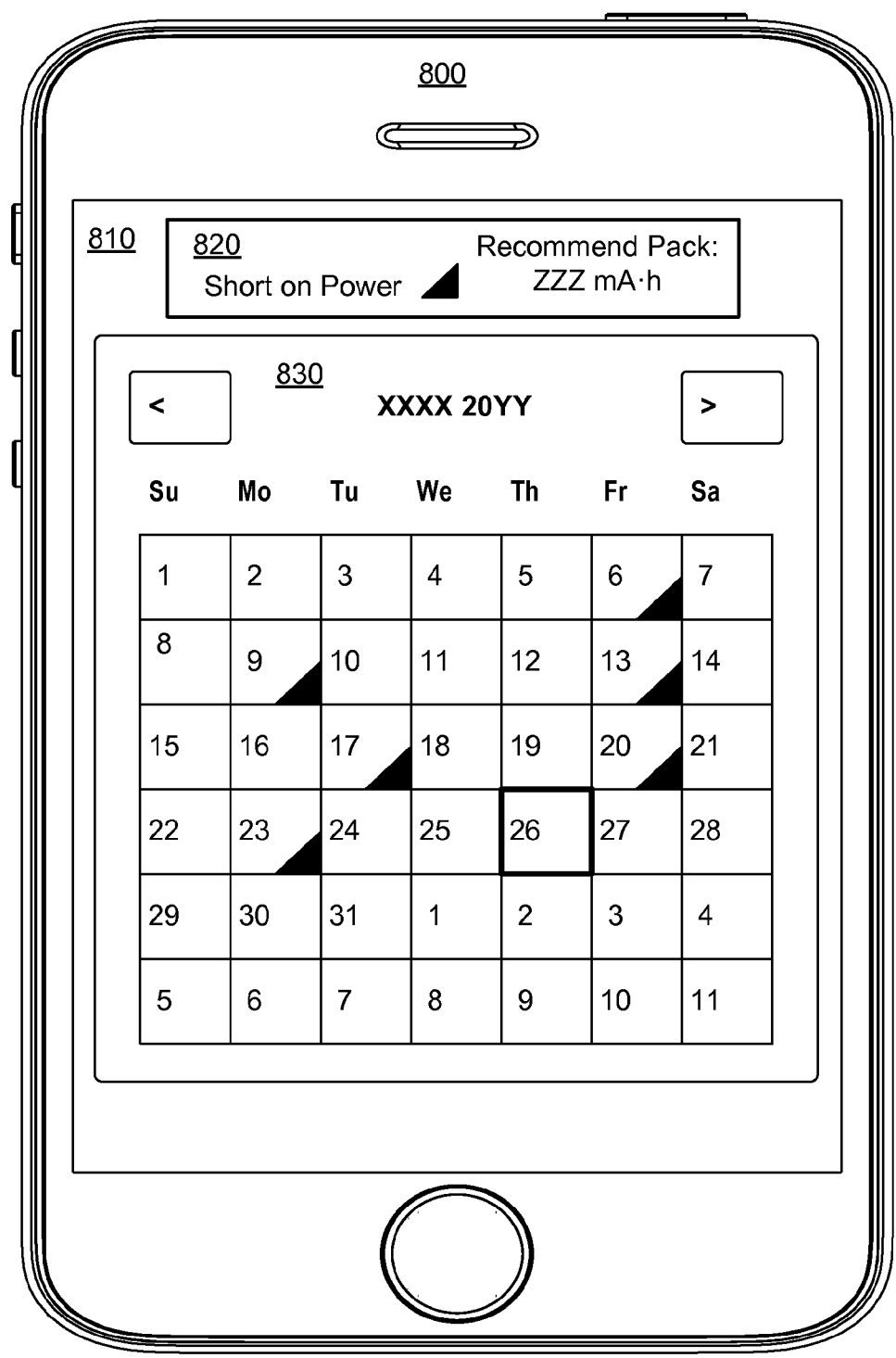
FIG. 8 is a diagram of an example of a device that includes a display to which a notice is rendered.

FIG. 8 shows an example of a device 800 that includes a display 810 and a notice 820 rendered to the display 810. In the example of FIG. 8, the notice 820 indicates a recommended battery power back-up pack, for example, in mA·h. Such an indication may correspond to historical information. For example, a calendar 830 is rendered to the display 810 that includes markers that indicate which days the device 800 experienced a power shortage. Based on the amount and/or frequency of such power shortages, the device 800 may determine a recommended capacity for a battery power back-up pack. In such an example, the device 800 may optionally access the Internet or another network to assess commercially available equipment. As an example, the notice 820 may be a graphical control that can be selected for activation to cause navigation to a website where the equipment may be available for order, purchase, etc.

Figure 9:
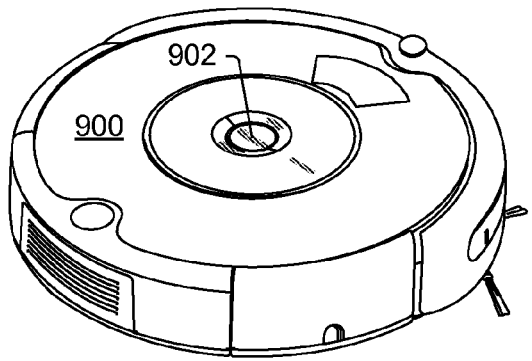
FIG. 9 is a diagram of an example of a robot and an example of a device that includes a display to which a notice is rendered.
Figure 9:
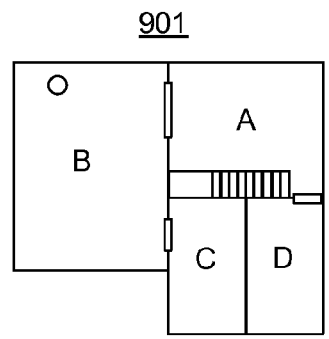
Figure 9:
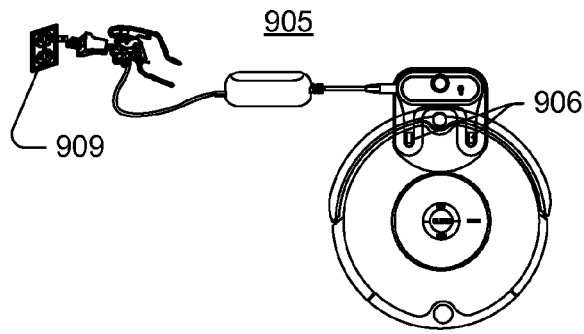
Figure 9:
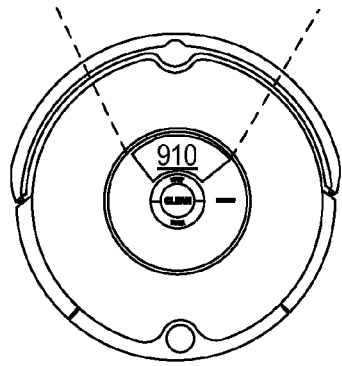
Figure 9:
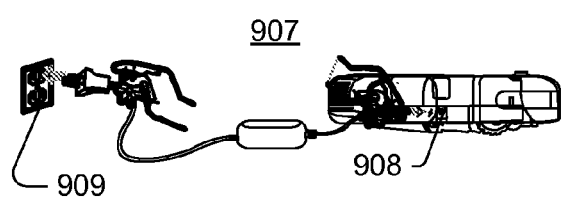
Figure 9:
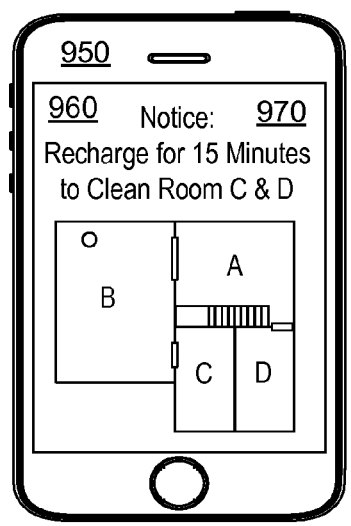

FIG. 9 shows an example of a robot 900 that include vacuum equipment such as, for example, a blower motor and a dust bin. Such vacuum equipment may be filtered or filterless (e.g., cyclone separation). As an example, the robot 900 may include a rechargeable battery or batteries that can be recharged via a station 905 using electrical contacts 906 or via a direct plug-in 907 using a socket 908. As an example, a power source may be an outlet 909 (e.g., a wall outlet, a floor outlet, an AC outlet, etc.).

As an example, a building floor 901 may include rooms A, B, C and D. As an example, the robot 900 may operate a light or lights 902 to provide one or more statuses, for example, per the table 903. Such information may be insufficient to allow one to determine whether one or more rooms of the floor 901 may be adequately cleaned. As an example, the robot 900 can include circuitry that can determine how much charge is suitable (e.g., a power level) to complete cleaning of one or more of the rooms of the floor 901. In such an example, the robot 900 may include memory with information as to sizes of the rooms of the floor 901. As an example, the robot 900 may utilize such information together with power level information to determine a target power level that is sufficient to clean one or more of the rooms of the floor 901. In such an example, the target power level may be less than 100 percent of fully charged. As an example, where "dirt" level information is available, such information may be taken into account (e.g., as the robot 900 may have to perform more passes, etc., to achieve a target level of cleanliness).

In the example of FIG. 9, the robot 900 may include a display 910 where circuitry of the robot 900 can render a notice 920 to the display 910 that indicates how much time it will take to achieve a power level suitable to clean one or more of the rooms of the floor 901.

As an example, a device 950 may be operatively coupled to the robot 900 (e.g., via a network, via BLUETOOTH® circuitry, etc.) where the device 950 may optionally perform one or more calculations and, for example, render information to a display 960 of the device 950. For example, the device 950 may render a notice 970, which may include a floorplan of the floor 901. As an example, the device 950 may render a location of the robot 900, an indication as to which rooms are clean, etc.

Figure 10:
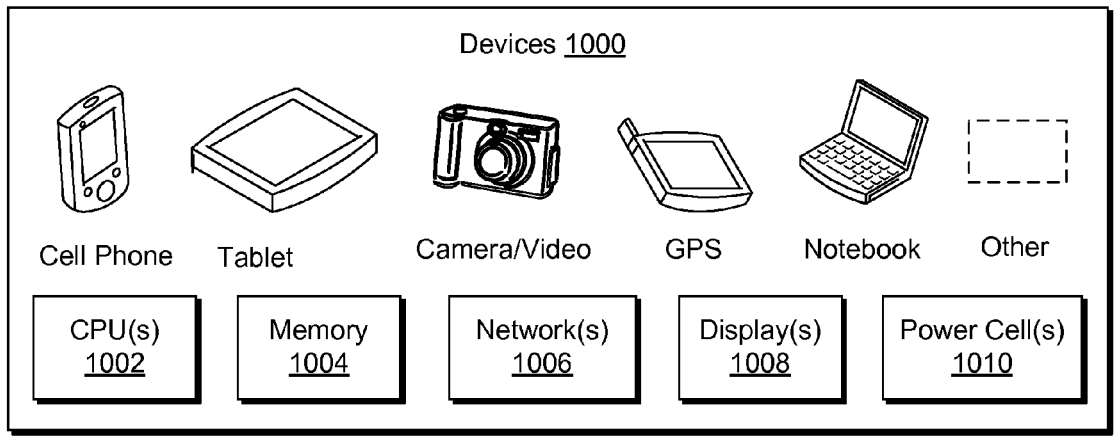
FIG. 10 is a diagram of examples of devices and an example of a vehicle.
Figure 10:
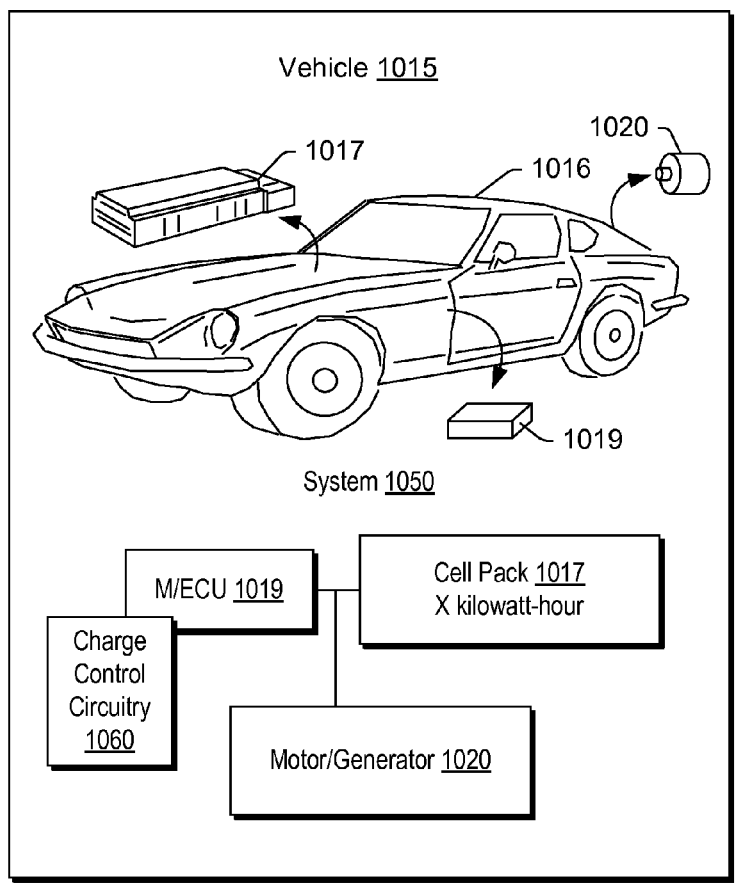

FIG. 10 shows some example devices 1000 that may be powered by one or more power cells 1010 (e.g., one or more batteries). For example, a cell phone, a tablet, a camera, a GPS device, a notebook computer, or other device may be powered by a power cell or cells. A device may include one or more processors 1002, memory 1004, one or more network interfaces 1006, and one or more displays 1008. A device can include notification circuitry, for example, to call for rendering of one or more notices to a display or displays. As an example, a notice may be rendered as a graphical user interface (GUI) to a display.

FIG. 10 also shows a vehicle 1015 as including a body 1016, a cell pack 1017, a motor and/or engine control unit 1019 (M/ECU) and a motor 1020 or motor and generator. Such a vehicle may include charge control circuitry 1060. As an example, the vehicle 1015 may include notification circuitry that can issue one or more notices as to a target power level to meet one or more goals (e.g., to reach a destination, etc.). Such a target power level can be less than 100 percent of a fully charged power level.

As an example, the vehicle 1015 may be a hybrid electric vehicle (HEV) where the cell pack 1017 is rated at about 1.4 kWh, for example, to absorb braking energy for immediate re-use in an acceleration cycle (e.g., using the electric motor and generator 1020 as a generator in a regenerative braking scheme). As an example, the vehicle 1015 may be a plug-in hybrid electric vehicle (PHEV) where the cell pack 1017 is rated at about 5.2 to 16 kWh, for example, to offer both hybrid and electric drive functions. As an example, the vehicle 1015 may be a battery electric vehicle (BEV) where the cell pack 1017 is rated at about 24 to 85 kWh or more to propel the vehicle 1015.

In the example of FIG. 10, the charge control circuitry 1060 may provide for management of a charge process for one or more cells of the cell pack 1017. As an example, the circuitry 1060 may act to control a charge voltage during one or more charge processes. As an example, a charge process may occur in response to braking (e.g., for a short period of time during which braking occurs). As another example, a charge process may occur through electrical connection to a power supply grid. As another example, a charge process may occur through a shaft of an internal combustion engine coupled to a generator that generates electrical power. In such examples, the circuitry 1060 may control a charge voltage for one or more cells of the cell pack 1017 according to a model, a schedule, etc.

As an example, circuitry may provide for issuing a notification as to a present level of charge of a cell pack and a level of charge to reach a particular destination via a vehicle that is powered at least in part by the cell pack. For example, where a GPS unit has been programmed with destination coordinates, a notification may indicate a charge time estimate to achieve a target level of charge of the cell pack to reach the destination. As an example, such an approach may indicate a charge station, optionally via a GPS unit, and a time to stop and charge to a target level where the target level is less than a full charge level.

As an example, a vehicle may include communication circuitry to communicate information to a smart phone where the smart phone may issue a notification as to one or more charge time estimates for charging a cell pack of the vehicle to a target level that is less than a fully charged level such that the vehicle, when powered by the cell pack, can reach an intended destination. In such an example, the driver may stop just long enough to charge to the target level (e.g., with a built-in surplus of a few percent) and still reasonably expect to reach the intended destination. In the foregoing example, a time notification may be helpful and more informative than an amount of charge level disparity alone because a user may be unaware of how long it may take to charge to compensate for the disparity. Further, a GPS or other direction/mapping system may utilize the time information in calculating an estimated arrival time (ETA). For example, without appropriate circuitry, a GPS or other direction/mapping system may be unable to "make sense" of a charge level disparity and therefore be unable to provide an ETA. Example circuitry may provide estimated time to charge to a target level at a charge station where such information may be utilized by GPS and/or other direction/mapping system to at least provide an ETA. As an example, such information may be utilized to provide a route and an ETA. As an example, information may be utilized to provide one or more "things to do" proximate to a charge station during an estimated charge time. For example, consider circuitry that estimates a charge time for a charge station and suggests an activity such as, for example, "a STARBUCKS café is two blocks down from the charge station, given the estimate charge time of 20 minutes, you can get there, get a coffee and get back to your vehicle".

As an example, a charging technique may include inductive charging (or "wireless charging") that uses an electromagnetic field to transfer energy between two objects. Inductive charging can be implemented using a charging station where energy is sent through an inductive coupling to an electrical device, which can then use that energy to charge batteries or run the device.

As an example, charging circuitry can include an induction coil that can create an alternating electromagnetic field from within a charging base station and a second induction coil in/operatively coupled to an electronic device that can take power from the electromagnetic field and, for example, converts to electrical current to charge a battery, power the device, etc. Two induction coils in proximity can form an electrical transformer. As an example, greater distances between sender and receiver coils may be achieved where an inductive charging system implements resonant inductive coupling.

As an example, an electronic device may be fit with a charging circuitry, optionally as a charging case. As an example, a system may include circuitry such as that of one or more of the DURACELL™ Powermat system (Procter & Gamble, Cincinnati, Ohio), the iQi Mobile charger system (iQi Mobile, London, UK), etc. The iQi Mobile charger system for the IPHONE™ device includes a relatively thin receiver (e.g., about 0.5 mm) and a flexible ribbon cable (e.g., about 1.4 mm) that runs to a lightning connector, allowing the receiver to remain plugged in when folded behind the device. The DURACELL™ Powermat system for the IPHONE™ device includes the AccessCase case with an inductive coil that sits just below the device's Lightning port.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. A computer-readable medium may be a storage device (e.g., a memory card, a storage disk, etc.) and referred to as a computer-readable storage medium.

Figure 11:
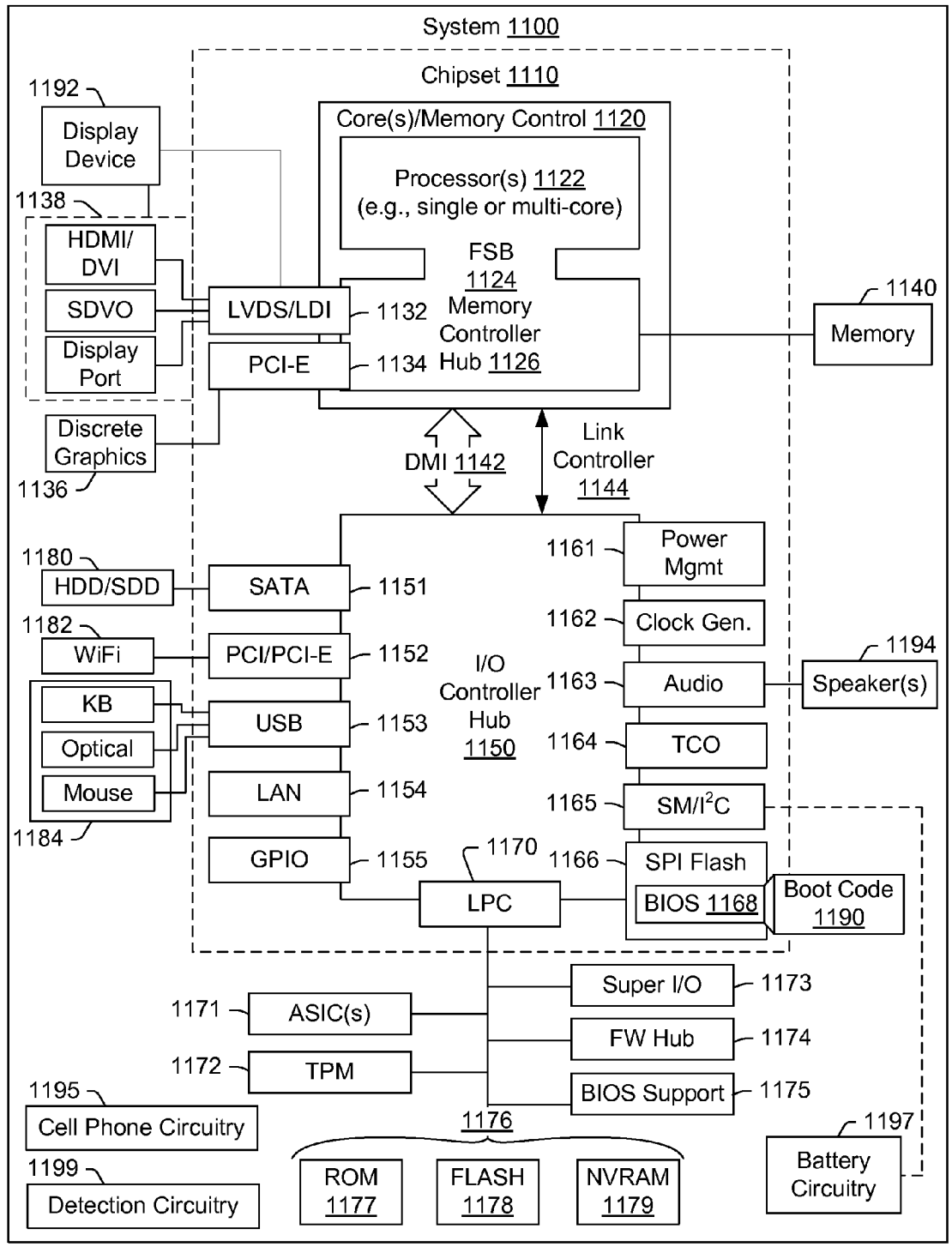
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As an example, a device such as, for example, one of the devices 1000 of FIG. 10 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). As mentioned, a USB interface may provide for charging and/or data transfer. One or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100), as well as detection circuitry 1199 (e.g., to detect a type of charging equipment, etc.). As mentioned, a SMBus may be operable via a LPC (see, e.g., the LPC interface 1170), via an I²C interface (see, e.g., the SM/I²C interface 1165), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   receiving power level information for a device that comprises a rechargeable battery and a display;
   determining a power level differential based at least in part on the power level information and historical information of the device, wherein the historical information comprises agenda information and wherein the agenda information comprises information for one or more scheduled cellular communications; and
   rendering a power level differential notice to the display.

2. The method of claim 1 wherein the power level differential is based on power levels that are less than a maximum power level of the rechargeable battery.

3. The method of claim 1 wherein the power level differential notice comprises an estimated recharge time to compensate for the power level differential.

4. The method of claim 3 wherein the estimated recharge time corresponds to one of a plurality of types of power sources for recharging the rechargeable battery.

5. The method of claim 1 wherein the power level differential is based at least in part on a time differential between a first time and a second time.

6. The method of claim 5 wherein the first time corresponds to a rechargeable battery powered state of the device.

7. The method of claim 5 wherein the second time corresponds to a plugged-in recharger powered state of the device based at least in part on the historical information.

8. The method of claim 1 wherein the determining comprises calculating the power level differential based at least in part on a difference between a first power level associated with the received power level information and a second power level associated with the historical information.

9. The method of claim 1 wherein the historical information comprises cellular communication information.

10. The method of claim 1 wherein the historical information is associated with one or more locations.

11. The method of claim 1 comprising receiving location information.

12. The method of claim 11 comprising associating the location information with at least a portion of the historical information.

13. The method of claim 1 wherein the rendering renders a power level associated with a corresponding recharge time.

14. The method of claim 1 wherein the rendering renders a plurality of power levels associated with a plurality of corresponding recharge times.

15. A device comprising:
   a processor;
   memory operatively coupled to the processor;
   a display operatively coupled to the processor;
   a rechargeable battery operatively coupled to at least the processor; and
   instructions stored in the memory executable by the processor wherein the instructions comprise instructions to instruct the processor to
      receive power level information;
      determine a power level differential based at least in part on the power level information and historical information, wherein the historical information comprises agenda information and wherein the agenda information comprises information for one or more scheduled cellular communications; and
      render a power level differential notice to the display.

16. The device of claim 15 wherein the power level differential is based on power levels that are less than a maximum power level of the rechargeable battery.

17. One or more non-transitory computer-readable storage media that comprises processor-executable instructions wherein the instructions comprise instructions executable to instruct the processor to
   receive power level information;
   determine a power level differential based at least in part on the power level information and historical information, wherein the historical information comprises agenda information and wherein the agenda information comprises information for one or more scheduled cellular communications; and
   render a power level differential notice to the display.

18. The one or more non-transitory computer-readable storage media of claim 17 wherein the power level differential is based on power levels that are less than a maximum power level of the rechargeable battery.

19. A method comprising:
receiving power level information for a device that comprises a rechargeable battery and a display;
determining a power level differential based at least in part on the power level information and historical information of the device;
receiving location information;
associating the location information with at least a portion of the historical information; and
rendering a power level differential notice to the display.

20. The method of claim 19 wherein the power level differential is based on power levels that are less than a maximum power level of the rechargeable battery.

21. The method of claim 19 wherein the power level differential notice comprises an estimated recharge time to compensate for the power level differential.

22. The method of claim 21 wherein the estimated recharge time corresponds to one of a plurality of types of power sources for recharging the rechargeable battery.

23. The method of claim 19 wherein the power level differential is based at least in part on a time differential between a first time and a second time.

24. The method of claim 23 wherein the first time corresponds to a rechargeable battery powered state of the device.

25. The method of claim 23 wherein the second time corresponds to a plugged-in recharger powered state of the device based at least in part on the historical information.

26. The method of claim 19 wherein the determining comprises calculating the power level differential based at least in part on a difference between a first power level associated with the received power level information and a second power level associated with the historical information.

27. The method of claim 19 wherein the historical information comprises cellular communication information.

28. The method of claim 19 wherein the historical information comprises agenda information.

29. The method of claim 28 wherein the agenda information comprises information for one or more scheduled cellular communications.

30. The method of claim 19 wherein the historical information is associated with one or more locations.

31. The method of claim 19 wherein the rendering renders a power level associated with a corresponding recharge time.

32. The method of claim 19 wherein the rendering renders a plurality of power levels associated with a plurality of corresponding recharge times.

33. A device comprising:
a processor;
memory operatively coupled to the processor;
a display operatively coupled to the processor;
a rechargeable battery operatively coupled to at least the processor; and
instructions stored in the memory executable by the processor wherein the instructions comprise instructions to instruct the processor to
receive power level information;
determine a power level differential based at least in part on the power level information and historical information;
receive location information;
associate the location information with at least a portion of the historical information; and
render a power level differential notice to the display.

34. The device of claim 33 wherein the power level differential is based on power levels that are less than a maximum power level of the rechargeable battery.

35. One or more non-transitory computer-readable storage media that comprises processor-executable instructions wherein the instructions comprise instructions executable to instruct the processor to
receive power level information;
determine a power level differential based at least in part on the power level information and historical information;
receive location information;
associate the location information with at least a portion of the historical information; and
render a power level differential notice to the display.

36. The one or more non-transitory computer-readable storage media of claim 35 wherein the power level differential is based on power levels that are less than a maximum power level of the rechargeable battery.

* * * * *